(12) United States Patent
Leigh et al.

(10) Patent No.: US 10,895,697 B2
(45) Date of Patent: Jan. 19, 2021

(54) OPTICAL ADAPTERS

(71) Applicant: Hewlett Packard Enterprise Development LP, Houston, TX (US)

(72) Inventors: Kevin B. Leigh, Houston, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 220 days.

(21) Appl. No.: 15/487,859

(22) Filed: Apr. 14, 2017

(65) Prior Publication Data

US 2018/0299624 A1    Oct. 18, 2018

(51) Int. Cl.
*G02B 6/38* (2006.01)
*G02B 6/42* (2006.01)

(52) U.S. Cl.
CPC ......... *G02B 6/3825* (2013.01); *G02B 6/3881* (2013.01); *G02B 6/3885* (2013.01); *G02B 6/3893* (2013.01); *G02B 6/4246* (2013.01); *G02B 6/4256* (2013.01)

(58) Field of Classification Search
CPC .. G02B 6/3825; G02B 6/4256; G02B 6/3885; G02B 6/3893; G02B 6/3881
See application file for complete search history.

(56) References Cited

U.S. PATENT DOCUMENTS

| 4,952,798 | A | * | 8/1990 | Graham | G02B 6/266 |
| | | | | | 250/227.11 |
| 4,982,083 | A | * | 1/1991 | Graham | G02B 6/266 |
| | | | | | 250/227.11 |
| 5,077,815 | A | * | 12/1991 | Yoshizawa | G02B 6/14 |
| | | | | | 385/28 |
| 5,333,221 | A | | 7/1994 | Briggs et al. | |
| 7,090,509 | B1 | * | 8/2006 | Gilliland | G02B 6/4246 |
| | | | | | 385/92 |
| 7,338,214 | B1 | * | 3/2008 | Gurreri | G02B 6/3849 |
| | | | | | 385/53 |
| 9,494,744 | B2 | | 11/2016 | de Jong | |
| 9,684,130 | B2 | * | 6/2017 | Veatch | G02B 6/2726 |
| 9,726,830 | B1 | * | 8/2017 | Gniadek | G02B 6/3821 |
| 2006/0269208 | A1 | * | 11/2006 | Allen | G02B 6/3878 |
| | | | | | 385/135 |
| 2009/0191738 | A1 | * | 7/2009 | Kadar-Kallen | G02B 6/389 |
| | | | | | 439/207 |
| 2009/0220227 | A1 | * | 9/2009 | Wong | G02B 6/387 |
| | | | | | 398/41 |
| 2010/0054668 | A1 | * | 3/2010 | Nelson | G02B 6/381 |
| | | | | | 385/78 |
| 2011/0123157 | A1 | * | 5/2011 | Belsan | G02B 6/3816 |
| | | | | | 385/75 |
| 2011/0222819 | A1 | * | 9/2011 | Anderson | G02B 6/3825 |
| | | | | | 385/78 |

(Continued)

*Primary Examiner* — Thomas A Hollweg
*Assistant Examiner* — Mary A El-Shammaa
(74) *Attorney, Agent, or Firm* — Nolte Lackenback Siegel (57) ABSTRACT

Examples described herein include optical adapters. In some examples, an optical connector adapter includes a housing with a first end and a second end, a latch assembly inside the housing, and an adapter optical ferrule. The latch assembly may include two latch arms and an engagement feature to mate the adapter to a number of optical transceiver shells. The engagement feature may protrude beyond the second end of the housing. The adapter optical ferrule is attached to the two latch arms.

20 Claims, 5 Drawing Sheets

(56) References Cited

U.S. PATENT DOCUMENTS

| | | | |
|---|---|---|---|
| 2011/0317976 A1* | 12/2011 | Eckstein | G02B 6/3825 |
| | | | 385/139 |
| 2012/0099822 A1* | 4/2012 | Kuffel | G02B 6/381 |
| | | | 385/78 |
| 2012/0257862 A1 | 10/2012 | Deel et al. | |
| 2013/0121650 A1 | 5/2013 | Mizobuchi et al. | |
| 2014/0133808 A1* | 5/2014 | Hill | G02B 6/3826 |
| | | | 385/81 |
| 2014/0219614 A1* | 8/2014 | Marcouiller | G02B 6/3817 |
| | | | 385/88 |
| 2014/0219615 A1* | 8/2014 | Petersen | G02B 6/3817 |
| | | | 385/88 |
| 2016/0131854 A1* | 5/2016 | de Jong | G02B 6/3821 |
| | | | 385/59 |
| 2017/0293090 A1* | 10/2017 | Hopper | G02B 6/3871 |
| 2018/0031782 A1* | 2/2018 | Zseng | G02B 6/3887 |

\* cited by examiner

OPTICAL ADAPTERS

BACKGROUND

Data centers may include multiple computing devices that communicate with each other. For example, a rack server may communicate to a blade enclosure, which may also communicate to networking devices such as switches. In some examples, some of these devices may operate in an optical mid-plane and may use optical fibers and optical connectors to communicate.

BRIEF DESCRIPTION OF THE DRAWINGS

The following detailed description references the drawings, wherein.

DETAILED DESCRIPTION

Optical transceivers may allow an optical cable to connect to a networking system through a connector portion of the optical transceiver. The electronics in an optical transceiver may be designated by the data center networking industry standard multi-source agreements (MSA) such as QSFP, QSFP-DD, OSFP, etc. Thus, each type of transceiver may have different electronic requirements to support different optical signals. Additionally, a connector portion may allow for a different types or different number of optical interfaces for a connected optical cable. For example, a connector portion may allow for an optical interface comprising a two-fiber interface. In another example, a connector portion may allow for an optical interface comprising a four-fiber interface. In yet another example, a connector portion may allow for two optical interfaces, each interface having two fibers. Furthermore, in another example, a connector portion may allow for four optical interfaces, each interface having four fibers.

In some examples, the transceiver may have a specific type of connector portion that is integrally formed with the transceiver. In other words, the transceiver and the connector portion do not separate or come apart. However, to fit a certain type of optical connector (e.g., an RO× optical connector) to a specific type of optical transceiver (e.g., a QSFP optical transceiver), significant connector design and associated testing have to be done for the connector portion of an integral shell by a transceiver manufacturer where the transceiver manufacturer may not have the expertise and resources to design and test optical connectors. Additionally, multiple integrally formed connector portions may need to be designed for different optical interfaces, e.g., RO×2 for two optical interfaces or RO×4 for four optical interfaces, for different transceiver electronics.

Examples described herein address these technical challenges by providing a modular optical transceiver. An optical connector adapter may include an engagement feature that allows it to be mated to a variety of transceiver shells and spacers. The optical connector adapter may include a variety of optical interfaces that are interchangeable with the transceiver shells and spacers. Accordingly, examples disclosed herein provide a way to adapt a transceiver shell to a specific type of optical connector without the need for transceiver manufactures to design and test optical connectors. In addition, transceiver manufacturers do not need to perform significant electrical and mechanical testing on the transceiver and the shell.

In some examples, an optical connector adapter comprises a housing with a first end and a second end, a latch assembly inside the housing, and an adapter optical ferrule. The latch assembly is inside the housing, and may comprise two latch arms and an engagement feature. The engagement feature is configured to mate the adapter to a number of optical transceiver shells. The engagement feature also protrudes beyond the second end of the housing. The adapter optical ferrule is attached to the two latch arms.

In some examples, an optical connector adapter comprises a housing with a first end and a second end, a latch assembly inside the housing, and a number of adapter optical ferrules. The latch assembly comprises a number of snap-in features protruding beyond the second end of the housing and a first engagement feature. The first engagement feature is configured to mate the adapter to a number of optical transceiver shells and protrudes beyond the second end of the housing. The number of adapter of optical ferrules are held by the number of snap-in features. Each adapter optical ferrule comprises a mating surface accessible from the first end of the housing.

In some examples, an optical transceiver comprises a housing with a first end and a second end, a number of snap-in features protruding beyond the second end of the housing, a first engagement feature protruding beyond the second end of the housing, a number of adapter optical ferrules held by the snap-in features, and a transceiver shell. The transceiver shell has a second engagement feature to interlock with the first engagement feature. Additionally, the transceiver shell has a first position that is mated with the housing and a second position that is disengaged from the housing.

Figures 1A, 1B:
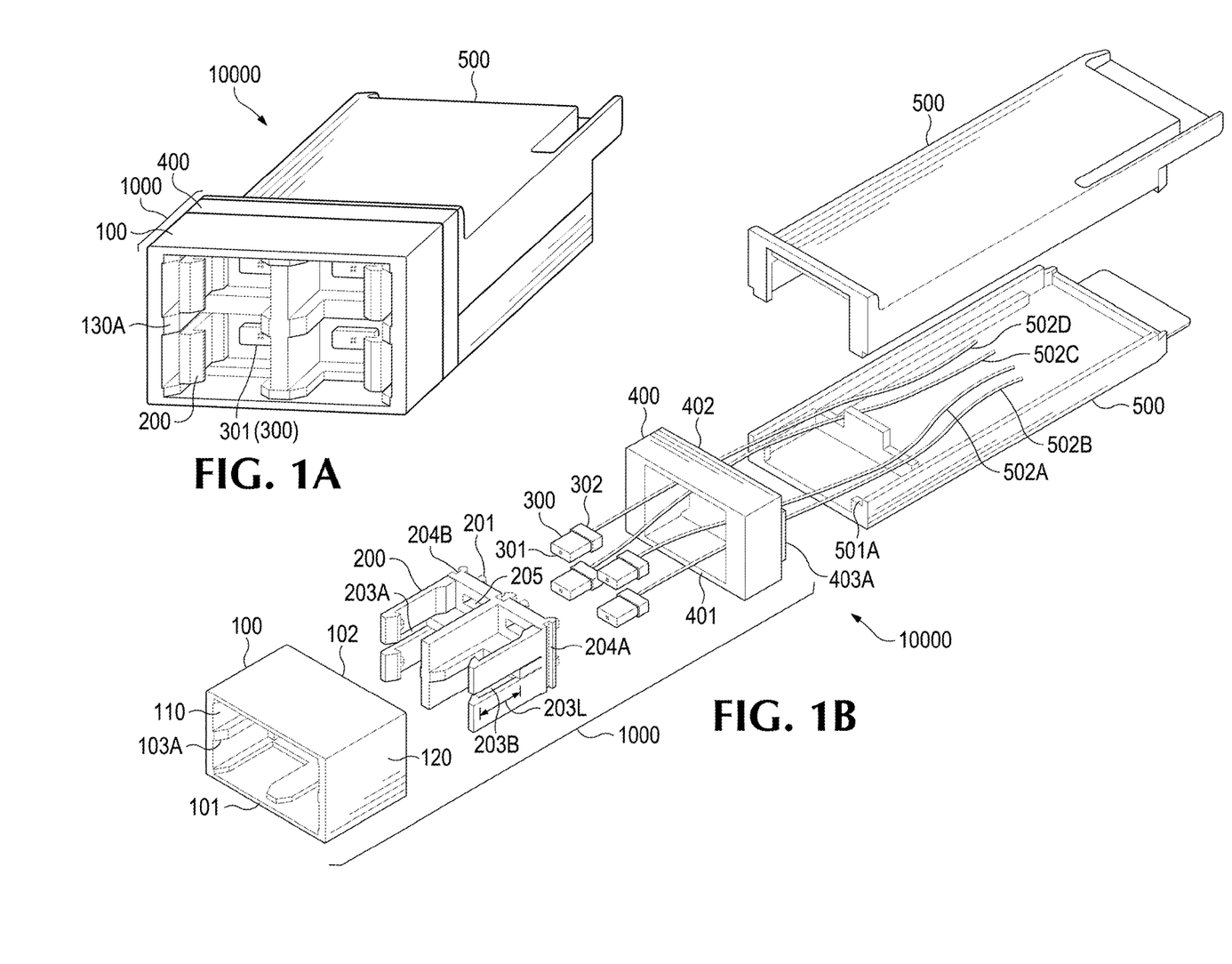
FIG. 1A illustrates a front view of an optical transceiver, according to some examples.
FIG. 1B illustrates an exploded view of the optical transceiver of FIG. 1A, according to some examples.

Referring now to the figures, FIG. 1A illustrates a front view of an optical transceiver 10000. As used herein, an optical transceiver includes a hardware that interfaces networking hardware to an optical cable. Optical transceiver 10000 comprises an optical connector adapter 1000 and a transceiver shell 500. Optical connector adapter 1000 may provide a physical interface to retain optical cable(s) and the transceiver shell 500 may house electronics for the optical transceiver 10000. In some examples, the interface of optical connector adapter 1000 is compatible with a specific type of optical cable connector design. For example, optical connector adapter 1000 may have an interface that is compatible with an RO× optical cable connector. In other words, an RO× cable may be inserted into optical transceiver 10000 and be retained by optical connector adapter 1000.

In some examples, the electronics in transceivers are guided by multi-source agreements and standards. Additionally, there are multiple transceiver types that may be used depending on the design of the system, including, but not limited to Quad Small Form-factor Pluggable (QSFP), Quad Small Form-factor Pluggable Double Density (QSFP-DD), Octal Small Format Pluggable (OSFP), and Small Form-factor Pluggable (SFP). Accordingly, transceiver shell 500 may house electronics that are specific to a certain type of transceiver.

Figure 2A:
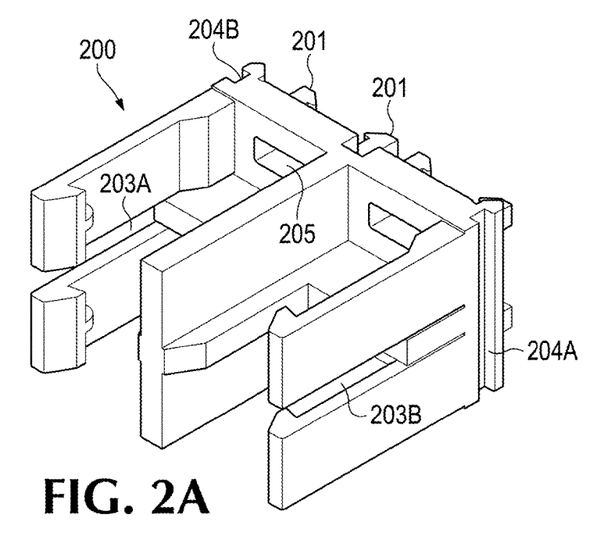
FIG. 2A illustrates a close-up view of the latch assembly of the optical transceiver of FIG. 1B, according to some examples.
Figure 2B:
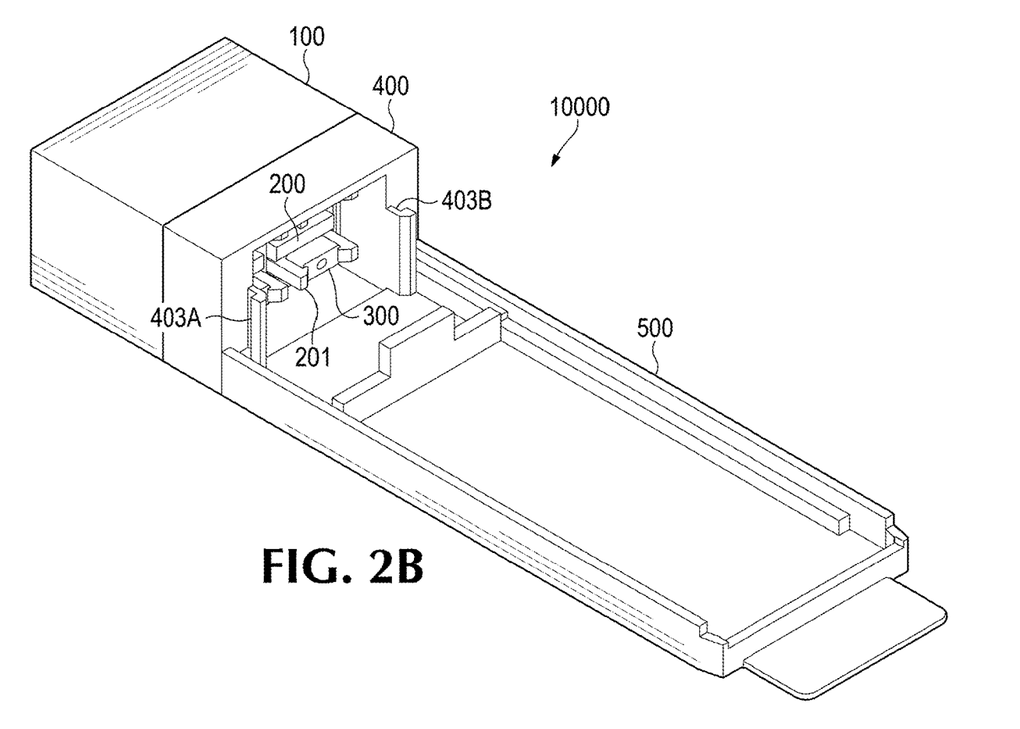
FIG. 2B illustrates a back view of the optical transceiver of FIG. 1A, according to some examples.

FIG. 1B illustrates an exploded view of optical transceiver 10000. FIG. 2A illustrates a close-up view of latch assembly 200 of FIG. 1B. FIG. 2B illustrates a back view of optical transceiver 10000. As illustrated in FIG. 1B, optical connector adapter 1000 may comprise a housing 100, a latch assembly 200 that is inside housing 100, an adapter optical ferrule 300 that is inserted into the latch assembly 200, and a spacer 400. As will be discussed herein, the interface for connection to an inserted optical cable may be provided by certain features of latch assembly 200 and adapter optical ferrule 300. Additionally, optical connector adapter 1000 may provide a number of interfaces for the inserted optical cable. As used herein, a number may include any number, including one interface, two interfaces, etc. Optical connector adapter 1000 has four interfaces for the optical cable or optical cables that are connected (shown in FIG. 1A). Accordingly, in optical transceiver 10000, one RO× optical cable may be inserted into optical connector adapter 1000. The one RO× optical fiber cable may have four lanes in the one cable (i.e., RO×4 cable). Each lane may connect to the four interfaces in the cable. In another example, four RO×1 cables may be individually inserted into optical transceiver 10000. Each RO×1 cable has one lane and each lane in each RO×1 cable may connect to a single interface in the optical connector adapter 1000. While optical connector adapter 1000 is shown in FIG. 1A as having four interfaces, optical connector adapter 1000 is not limited to having the number of interfaces shown.

Housing 100 includes a first end 101 and a second end 102. First end 101 is the end where optical cables may be inserted into optical transceiver 10000. Second end 102 is on the opposite side of first end 101 and may be flush with spacer 400 when optical transceiver 10000 is assembled. Housing 100 may act as a receptacle for latch assembly 200 and any connected optical cables. Accordingly, housing 100 may comprise an interior surface 110 and an exterior surface 120. Exterior surface 120 interacts with the outside environment. Interior surface 110 interacts with latch assembly 200.

In some examples, and as shown in FIG. 1B, latch assembly 200 and housing 100 are molded as separate pieces and then assembled together into one piece. In other words, latch assembly 200 may disengage from housing 100. To align latch assembly 200 to housing 100 such that latch assembly 200 is assembled accurately into housing 100, housing 100 may comprise a horizontal ridge 103A that extends horizontally along internal surface 110 from first end 101 to second end 102. Latch assembly 200 may comprise a corresponding horizontal channel 203A that may engage with horizontal ridge 103A. Thus, latch assembly 200 may be inserted into housing 100 from second end 102. Horizontal ridge 103A may slide inside horizontal channel 203A in latch assembly 200 to align latch assembly 200 and housing 100.

As described herein, latch assembly 200 may comprise components that protrude beyond second end 102 of housing 100. The length 203L of horizontal channel 203A in latch assembly 200 may control how much these components protrude beyond second end 102. For example, the shorter the length 203L, the more these components protrude beyond second end 102. As another example, the longer the length 203L, the less these components protrude beyond second end 102. The length of extension of horizontal ridge 103A along internal surface 110 may be similar to the length of horizontal channel 203A. In some examples, and as shown in FIG. 1B, latch assembly 200 may comprise two similar horizontal channels 203A and 203B, one on opposite sides of latch assembly 200. Accordingly, in these examples, housing 100 may also comprise two horizontal ridges, one on opposite sides of housing 100. The horizontal channel 103B opposing horizontal channel 103A is not visible by the view provided in FIG. 1B but is visible in FIG. 1A.

In other examples, latch assembly 200 may be integrally molded with housing 100 as one piece. In these examples, latch assembly 200 may not have horizontal channels 203A and 203B and housing may not have corresponding horizontal ridges 103A and 103B.

Latch assembly 200 may comprise an engagement feature 204A, a number of snap-in features 201, and a number of optical openings 205. Optical openings 205 are clearly seen in FIG. 2A. Engagement feature 204A may protrude beyond second end 102 of housing 100 and is configured to mate housing 100 of optical connector adapter 1000 to spacer 400. In some examples, and as shown in FIGS. 1B and 2A, engagement feature 204A may comprise a vertical groove extending on an external surface 210 of latch assembly 200. This is shown in an up-close view in FIG. 2A. Additionally, latch assembly 200 may comprise an engagement feature 204B that is similar to 204A on the opposing side of latch assembly 200. Spacer 400 may comprise corresponding engagement features that are complementary to engagement features 204A and 204B of latch assembly 200. Thus, in examples where engagement feature 204A is a vertical groove, corresponding engagement feature on spacer 400 may be a complementary vertical protrusion that can be slid into the vertical groove.

In addition to being configured to mate housing 100 of optical connector adapter 1000 to spacer 400, engagement feature 204A is configured to mate housing 100 to a number of transceiver shells, including the shell shown in FIGS. 1A-2B. Accordingly, engagement feature 204A may engage the corresponding engagement features on a number of spacers and/or transceiver shells, allowing optical connector adapter 1000 to be paired with any number of spacers and/or transceiver shells that have corresponding engagement feature that are complementary to engagement feature 204A. As used herein, a feature is complementary to another feature if the two features may interlock.

Accordingly, while FIGS. 1A-2B show optical transceiver 10000 with spacer 400, in other examples, optical transceiver 10000 does not have spacer 400 and optical connector adapter 1000 is connected directly to transceiver shell 500. This means that engagement feature 204A may mate optical connector adapter 1000 with spacer 400 but it may also mate optical connector adapter 1000 with transceiver shell 500 without the presence of spacer 400. Accordingly, optical connector adapter 1000 may first be mated to a first transceiver shell 500. The electronics of first transceiver shell 500 may follow one MSA standard (e.g., QSFP-DD). At a later time period, optical connector adapter 1000 may be mated to a second transceiver shell 500 that is different from the first transceiver shell 500 (e.g., OSFP). This allows optical transceiver 10000 to be modular such that a transceiver manufacturer may assemble different transceiver shells and/ or spacers to the same optical connector adapter 1000 to create different product part numbers for optical transceivers 10000.

The number of snap-in features 201, like the engagement feature 204A may also protrude beyond the second end 102 of housing 100. In some examples, a single snap-in feature comprises two latch arms that are spring loaded towards each other. This allows the latch arms to grasp something that is inserted between the two latch arms. Latch assembly 200 also comprises a number of optical openings 205. In some examples, the number of optical openings 205 match the number of snap-in features 201. For example, a latch assembly 200 that has two snap-in features 201 also has two optical windows 205. A single optical window 205 may be framed by a single snap-in feature 201.

Referring back to FIG. 1B, optical connector adapter 1000 also comprises a number of adapter optical ferrules 300. In some examples, the number of adapter optical ferrules 300 is equal to the number of snap-in features 201. Thus, an optical connector adapter 1000 that has four snap-in features 201 also has four adapter optical ferrules. Adapter optical ferrule 300 comprises a first end 301 and a second end 302. The first end 301 is inserted into the snap-in feature 201 and optical window 205 of latch assembly 200. The snap-in feature 201 holds the adapter optical ferrule in the optical window 205. Accordingly, first end 301 of adapter optical ferrule 300 may sit inside housing 100 and second end 302 of adapter may protrude beyond second end 102 of housing 100. Thus, the optical window 205 allows the first end 301 of adapter optical ferrule 300 to be mated with a ferrule in an optical cable from front end 101 of housing 100 (and accordingly, accessible from front end 101 of housing 100). Adapter optical ferrule 300 allows for interface of the electronics housed in transceiver shell to communicate with connected optical cables.

Figure 4:
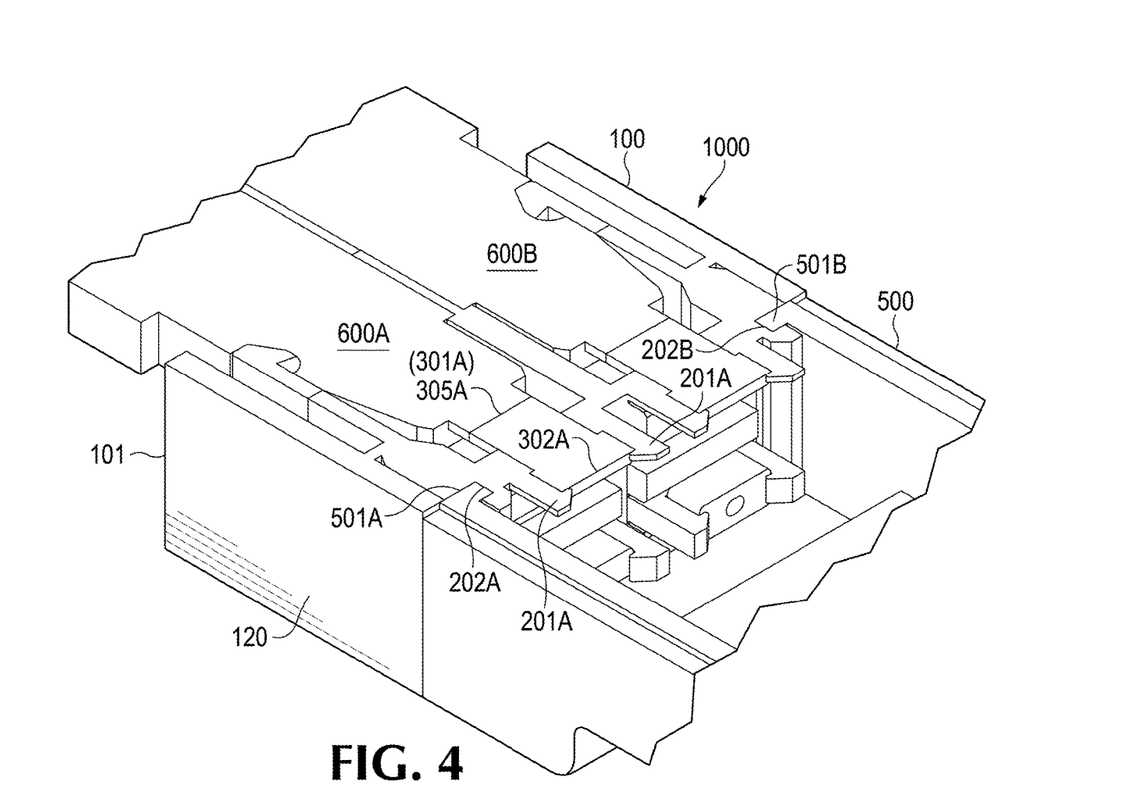
FIG. 4 illustrates a horizontal cross-section of the optical connector adapter of FIG. 3 along line A-A, according to some examples.

For example, first end 301 of adapter optical ferrule 300 acts as a mating surface 305 (as shown in FIG. 4) to mate with a ferrule of an optical cable that is inserted into optical connector adapter 1000. Adapter optical ferrule 300 comprises at least one optical fiber running from inside adapter optical ferrule 300 back to transceiver shell 500. The at least one optical fiber may be housed in optical jumper cables 502A, 502B, 502C, and 502D (as shown in FIG. 1B). The number of optical fibers that an adapter optical ferrule 300 has may depend on the transceiver shell 500 and the MSA standards used in the transceiver shell 500. For example, an OSFP transceiver shell may have two fibers per adapter optical ferrule for two interfaces or four fibers per adapter optical ferrule for four interfaces. Accordingly, in an optical transceiver 10000 with four interfaces and thus four adapter optical ferrules 300, and with each adapter optical ferrules having four optical fibers, the total amount of optical fibers in the optical transceiver 10000 is 16 optical fibers.

In some examples, a portion of latch assembly 200 may be marked to indicate the number of optical fibers in the adapter optical ferrule 300. This mark may include any type of special identification on the latch assembly that indicates to a user how many optical fibers are in an interface, including but not limited to colors. Thus, for example, an optical transceiver 1000 with optical adapter ferrule 300 having two optical fibers in the ferrule may be marked with a white color while an optical adapter ferrule 300 having four optical fibers in the ferrule may be marked with a yellow color. This marking may be for the entire portion of latch assembly that is visible from the first end 101 of housing 100, or it may include a small portion of the latch assembly that is visible from the first end. This may also include the entire latch assembly. Additionally, housing 100 may have a contrasting color, e.g., black, with respect to the latch assembly color. In some examples, each optical adapter ferrule in the optical adapter connector 1000 has the same number of optical fibers. Thus, optical adapter connector 1000 may have four optical adapter ferrules 300. Each optical adapter ferrule of the four optical adapter ferrules may have 2 optical fibers.

As discussed above, engagement feature 204A of latch assembly 200 is configured to mate housing 100 to spacer 400. Accordingly, spacer 400 may comprise a corresponding engagement feature to interlock with engagement feature 204A of latch assembly 200. For example, engagement feature 204A may comprise a vertical groove. Engagement feature of spacer 400 that interlocks with engagement feature 204A may be a vertical protruding rib that slides into the vertical groove. Spacer 400 also comprises a first end 401 and a second end 402. First end 401 of spacer 400 may be flush with second end 102 of housing 100 when engagement feature 204A interlocks with the corresponding engagement feature of spacer 400. The corresponding engagement feature of spacer 400 may be placed in an interior space of spacer 400 that is closer to a first end 401 of spacer 400 relative to second end 402 of spacer 400. With spacer 400 mated to housing 100, snap-in feature 201 of latch assembly 200 and adapter optical ferrule 300 may sit inside spacer 400. This is visible in FIG. 2B, which illustrates a back view of optical transceiver 10000.

Referring back to FIG. 1B, spacer 400 also comprises an engagement feature 403A at second end 402. Engagement feature 403A is configured to mate spacer 400 to transceiver shell 500. In some examples, engagement feature 403A is similar in size and shape to engagement feature 204A of latch assembly 200. This is because both engagement features 403A and 204A may interlock with the same component of transceiver shell 500. In other words, transceiver shell 500 can mate with spacer 400 or mate with latch assembly 200. This adds to the modular ability of optical transceiver 10000. In some examples, engagement feature 204A may be characterized as a "first engagement" feature and engagement feature 403A may be characterized as a "second engagement" feature. In some examples, spacer 400 comprises an engagement feature 403B that is similar to engagement feature 403A that is on the opposing side of spacer. This is visible in FIG. 2B.

Figure 7:
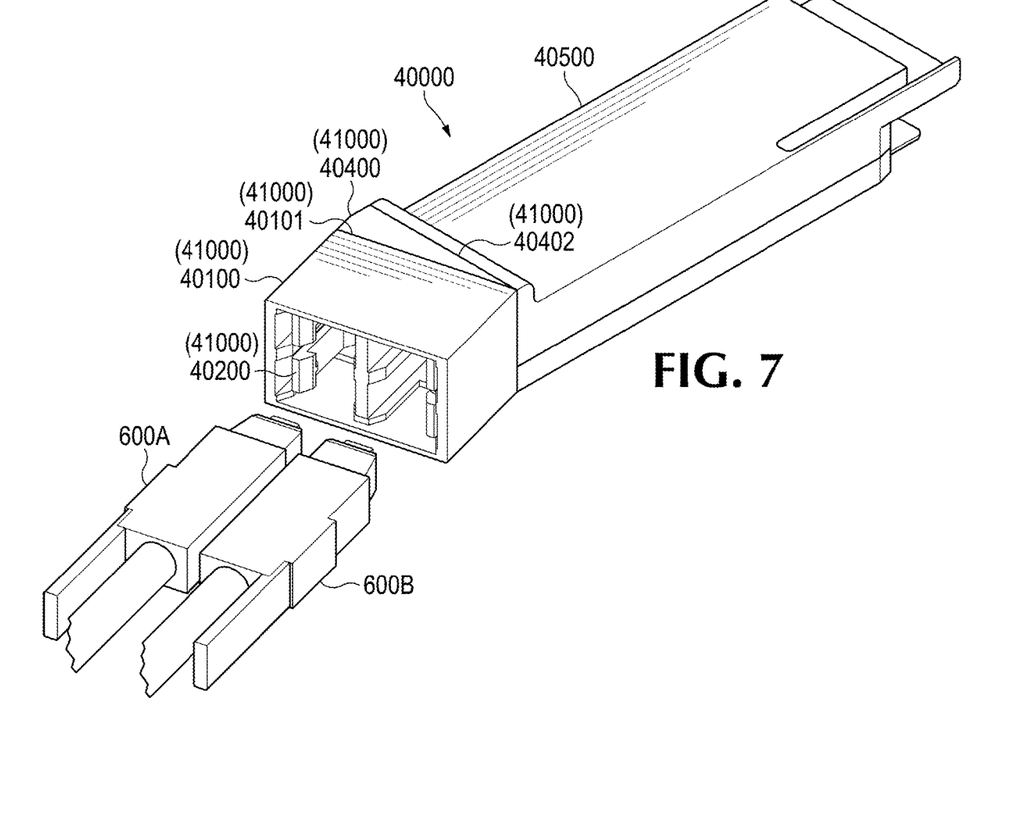
FIG. 7 illustrates a top view of an optical transceiver with an angled spacer, according to some examples.

With the addition of spacer 400, the distance between a transceiver shell 500 and the housing 100 increases. This increased distance may accommodate for transceiver shells that have longer optic fibers and cables. Accordingly, spacer 400 may be removed in instances where there are shorter optic fibers running in transceiver shell 500. In some examples, and as shown in FIGS. 1A-2B, first end 401 and second end 402 are parallel to each other. This allows for an extension of the length of optical transceiver 10000 without any bending of the optical transceiver 10000. In other examples, first end 401 and second end 402 of spacer 400 are not parallel to each other. Thus, one end may be angled relative to the other end. This allows spacer 400 to provide a bend for a given transceiver shell 500 and a housing 100. This may accommodate for bends and turns in cable management systems and is illustrated in FIG. 7.

As discussed above, transceiver shell 500 may mate to either spacer 400 or latch assembly 200. In some examples, transceiver shell 500 comprises a corresponding engagement feature 501A that interlocks with engagement feature 403A on spacer 400. Corresponding engagement feature 501A also interlocks with engagement feature 204A on latch assembly 200. As discussed above, engagement feature 204A and/or engagement feature 403A may comprise a vertical groove. In these examples, corresponding engagement feature 501A may comprise a vertical protrusion that slides into the vertical groove. In some examples, transceiver shell 500 comprises a second corresponding engagement feature 501B on the opposite side of transceiver shell to interlock with engagement features 204B and/or 403B. Accordingly, transceiver shell 500 has a first position in which it is mated with housing 100 and/or spacer 400, as shown in FIG. 1A, and a second position in which it is disengaged from housing 100 and/or spacer 400. The first position may be due to the corresponding engagement feature 501A interlocking with engagement features 403A and/or 204A. The second position may be due to the corresponding engagement feature 501A being disconnected or disengaged from engagement features 403A and/or 204A.

In some examples where transceiver shell 500 is mated to housing 100 and not to spacer 400, transceiver shell 500 may mate to housing 100 such that transceiver shell encloses over housing 100, instead of connecting to second end 102 of housing 100. In those examples, transceiver shell 500 may be flush with first end 101 of housing 100. This is illustrated in FIGS. 5 and 6.

Figure 3:
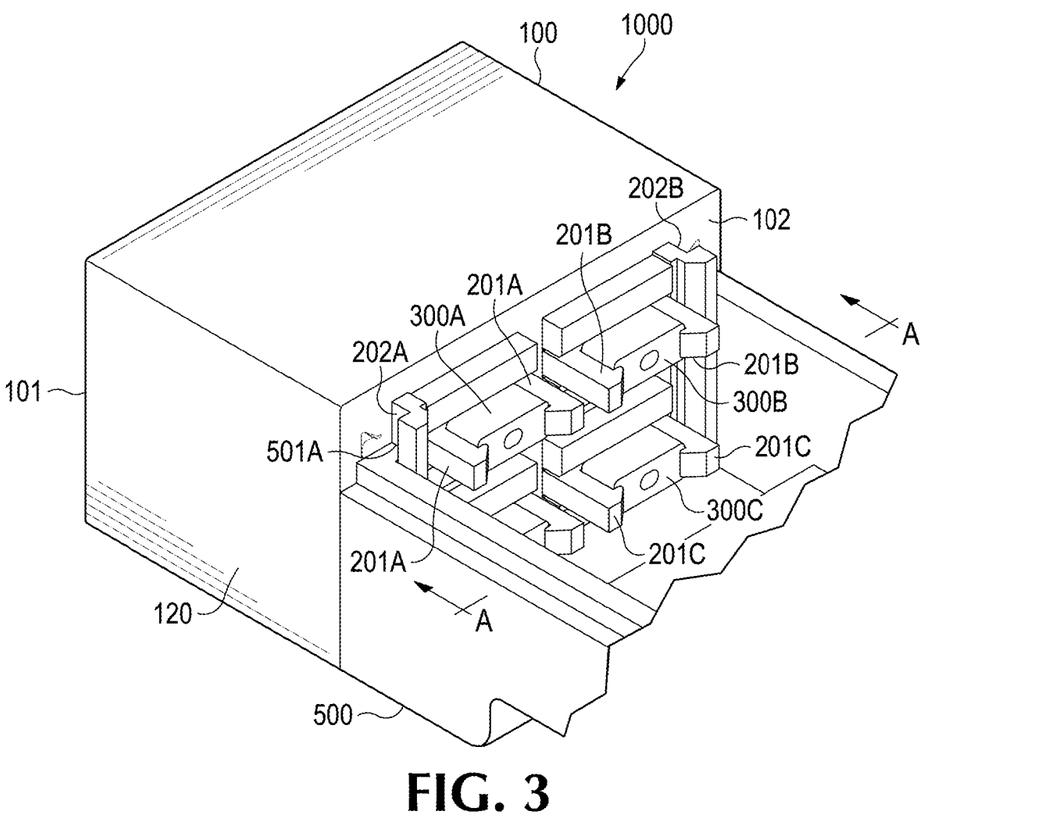
FIG. 3 illustrates an optical connector adapter, according to some examples.

FIG. 3 illustrates an optical adapter 1000 mated to a transceiver shell 500 without spacer 400. As shown in FIG. 3, corresponding engagement feature 501A of transceiver shell 500 also interlocks with engagement feature 202A of latch assembly 200 with spacer 400 removed. Without spacer 400, snap-in features 201A, 201B, and 201C protrude beyond second end 102 of housing 100 into transceiver shell 500. Additionally, adapter optical ferrules 300A, 300B, and 300C also protrude beyond second end 102 of housing 100 into transceiver shell 500.

FIG. 4 illustrates a horizontal cross section of FIG. 3 at line A-A with optical cables 600A and 600B inserted into first end 101 of housing 100. Engagement features 202A and 202B of latch assembly 200 and corresponding engagement features 501A and 501B may be seen in FIG. 4. Additionally, first end 301A and second end 302A of adapter optical ferrule 300A is visible here. As shown in FIG. 4, first end 301A of adapter optical ferrule 300 may provide a mating surface 305A for the optical ferrule of optical cable 600A. This allows the linking of the optic fibers inside of optical cable 600 to optic fibers inside adapter optical ferrule 300A. The optic fibers inside adapter optical ferrules 300A are not shown here for clarity.

Figure 5:
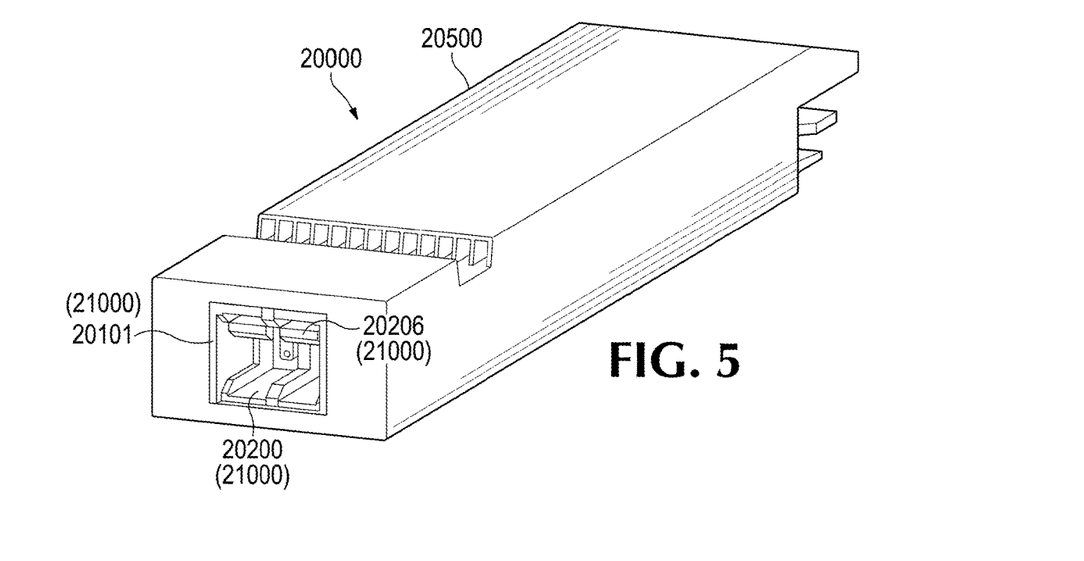
FIG. 5 illustrates a front, side view of an optical transceiver with two optical interfaces, according to some examples.
Figure 6:
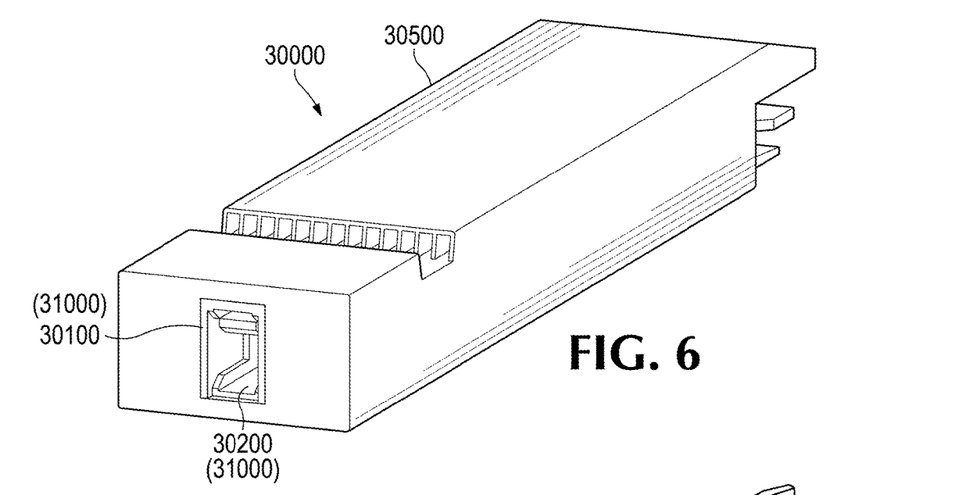
FIG. 6 illustrates a front, side view of an optical transceiver with one optical interface, according to some examples.

FIGS. 5-7 show a variety of different optical transceivers with different transceiver shells paired with different optical adapter connectors and/or spacers.

FIG. 5 illustrates optical transceiver 20000. Optical transceiver 20000 comprises a transceiver shell 20500, and an optical adapter connector 21000. Optical adapter connector 21000 comprises housing 20100 and a latch assembly 20200 inside housing 20100. A portion 20206 of latch assembly is marked to indicate to a user of optical transceiver 20000 that the optical adapter ferrules inside optical transceiver 20000 comprise a specific number of optical fibers (e.g., two optical fibers). FIG. 5 shows the marking as a color, but other markings may be used (e.g., letters, numbers, etc.)

Optical transceiver 20000 is similar to optical transceiver 10000 except for the housing arrangement, the number of interfaces for a connected optical cable, and the presence of a spacer. In optical transceiver 20000, housing 20100 is encased by transceiver shell 20500. Accordingly, transceiver shell 20500 is flush with first end 20101 of housing 20100. Additionally, in contrast to optical transceiver 10000, optical transceiver 20000 does not comprise a spacer. Optical adapter connector 21000 has two interfaces for a connected optical cable while optical adapter connector 1000 has four interfaces for a connected optical cable.

FIG. 6 illustrates optical transceiver 30000. Optical transceiver comprises a transceiver shell 30500 and an optical adapter connector 31000. Optical transceiver 30000 is similar to optical transceiver 20000 except that the optical adapter connector 31000 has one interface for a connected optical cable (in contrast to optical adapter connector 21000 with two interfaces.)

FIG. 7 illustrates optical transceiver 40000 with optical cables 600A and 600B. Optical transceiver 40000 comprises a transceiver shell 40500 mated to an optical adapter connector 41000. Optical adapter connector 41000 comprises a spacer 40400, a housing 40100, and a latch assembly 40200. Optical transceiver 40000 is similar to optical transceiver 10000 except in the number of interfaces for an inserted optical cable and the angle of the spacer 40400. Optical adapter connector 41000 provides two interfaces for the connected optical cable whereas optical adapter connector 1000 provides four interfaces. Additionally, optical adapter connector 41000 comprises an angled spacer 40400 as compared to the straight spacer shown in optical adapter connector 1000.

As shown in FIG. 7, a first end 40401 of spacer 40400 is angled relative to a second end 40402. This angled spacer allows housing 40100 to bend relative to optical transceiver 40500. This may adapt the optical transceiver accommodate situations with limited spacing. For example, a high density switch may have two rows of optical transceivers, with one row on top of the other. The top row may be angled up and the bottom row may be angled down such that cables running from the optical transceivers are easily distinguishable. Additionally, an angled spacer may allow for optic cable bend radiuses that may be useful in egressing the cable out of a rack.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An optical connector adapter comprising:
    a housing with a first opening and a second opening;
    a latch assembly inside the housing, the latch assembly comprising:
        two latch arms; and
        an engagement feature to mate the adapter to a number of optical transceiver shells, wherein the engagement feature protrudes beyond the second opening of the housing; and
    an adapter optical ferrule inserted between the two latch arms, wherein the adapter optical ferrule comprises an optical mating surface inside the housing.

2. The adapter of claim 1, wherein the engagement feature comprises a groove extending along an outside surface of the latch assembly.

3. The adapter of claim 1, wherein the two latch arms protrude beyond the second opening of the housing.

4. The adapter of claim 1, wherein the optical mating surface is at a first end of the adapter optical ferrule.

5. The adapter of claim 4, wherein a second end of the adapter optical ferrule protrudes beyond the second opening of the housing.

6. The adapter of claim 1, wherein the latch assembly is removable from the housing.

7. The adapter of claim 6,
wherein the latch assembly comprises a channel;
wherein the housing comprises a ridge extending along an internal surface of the housing; and
wherein the ridge engages with the channel to align the latch assembly inside the housing.

8. The adapter of claim 1, wherein the adapter optical ferrule comprises a number of optical fibers, and a portion of the latch assembly is marked to match the number of optical fibers.

9. The adapter of claim 8, wherein the portion of the latch assembly that is marked is visible from the first opening of the housing.

10. The adapter of claim 1, comprising a spacer, wherein the engagement feature is to mate the adapter to the spacer.

11. The adapter of claim 10, wherein the spacer comprises a second engagement feature to mate the spacer to the number of optical transceiver shells.

12. The adapter of claim 10, wherein the spacer is angled relative to the housing.

13. An optical connector adapter comprising:
a housing with a first opening and a second opening;
a latch assembly inside the housing, the latch assembly comprising:
  a number of snap-in features extending from inside the housing through the second opening to protrude beyond the second opening of the housing;
  a first engagement feature to mate the adapter to a number of optical transceiver shells, wherein the first engagement feature protrudes beyond the second opening of the housing;
a number of adapter optical ferrules held by the number of snap-in features, wherein each adapter optical ferrule comprises a mating surface accessible through the first opening of the housing.

14. The adapter of claim 13, comprising a spacer, wherein the first engagement feature is to mate the adapter to the spacer.

15. The adapter of claim 14, wherein the spacer comprises a second engagement feature to mate the spacer to the number of optical transceiver shells.

16. The adapter of claim 15, wherein the first engagement feature and the second engagement feature are similar.

17. The adapter of claim 13, wherein the first engagement feature comprises a groove extending along an outside surface of the latch assembly.

18. The adapter of claim 13, wherein each adapter optical ferrule comprises a number of optical fibers, and the latch assembly is color coded to match the number of optical fibers.

19. An optical transceiver comprising:
a housing with a first opening and a second opening;
a latch assembly inside the housing, the latch assembly comprising:
  a number of snap-in features protruding beyond the second opening of the housing; and
  a first engagement feature protruding beyond the second opening of the housing;
a number of adapter optical ferrules held inside the housing by the snap-in features; and
a transceiver shell with a corresponding engagement feature to interlock with the first engagement feature, wherein the transceiver shell has a first position that is mated with the housing and a second position that is disengaged from the housing.

20. The optical transceiver of claim 19, wherein the latch assembly is removable from the housing.

* * * * *